(12) United States Patent
Moreno Vallejo et al.

(10) Patent No.: US 8,662,536 B2
(45) Date of Patent: Mar. 4, 2014

(54) DEVICE FOR SIDEWAYS MOVEMENT

(75) Inventors: Ildefonso Moreno Vallejo, Algete (ES);
Simón Pedro González Muñoz, Algete (ES)

(73) Assignee: Sociedad Espanola de Electromedicina y Calidad, S.A., Madrid (ES)

( * ) Notice: Subject to any disclaimer, the term of this patent is extended or adjusted under 35 U.S.C. 154(b) by 0 days.

(21) Appl. No.: 13/503,477

(22) PCT Filed: Nov. 5, 2009

(86) PCT No.: PCT/ES2009/070481
§ 371 (c)(1),
(2), (4) Date: Apr. 23, 2012

(87) PCT Pub. No.: WO2011/054978
PCT Pub. Date: May 12, 2011

(65) Prior Publication Data
US 2012/0235394 A1 Sep. 20, 2012

(51) Int. Cl.
*B60S 9/18* (2006.01)
(52) U.S. Cl.
USPC .......... 280/767; 280/35; 280/79.11; 280/769; 280/79.7; 378/198

(58) Field of Classification Search
USPC .................. 280/79.7, 767; 378/198
See application file for complete search history.

(56) References Cited

U.S. PATENT DOCUMENTS

| | | | | |
|---|---|---|---|---|
| 5,586,162 A | * | 12/1996 | Grichnik | 378/198 |
| 5,667,230 A | * | 9/1997 | Riley et al. | 280/79.11 |
| 6,432,003 B1 | * | 8/2002 | van Nimwegen | 473/481 |

FOREIGN PATENT DOCUMENTS

| | | | |
|---|---|---|---|
| DE | 3712915 A1 | * | 10/1987 |
| EP | 0628463 A1 | | 12/1994 |
| EP | 670256 A1 | * | 9/1995 |
| FR | 1526694 A | | 5/1968 |

OTHER PUBLICATIONS

International Search Report, 4 Pages Dated Jul. 28, 2010.

* cited by examiner

*Primary Examiner* — J. Allen Shriver, II
*Assistant Examiner* — Hilary L Johns
(74) *Attorney, Agent, or Firm* — Dickinson Wright PLLC

(57) ABSTRACT

This invention is designed to provide a device for sideways movement which will permit an element to move laterally, such as a set of portable x-ray equipment which is affixed to said device.

9 Claims, 3 Drawing Sheets

DEVICE FOR SIDEWAYS MOVEMENT

CROSS REFERENCE TO RELATED APPLICATION

This application is a National Stage of International Application No. PCT/ES2009/070481 filed Nov. 5, 2009. The entire disclosure of the above application is incorporated herein by reference.

OBJECT OF THE INVENTION

This invention is designed to provide a device for sideways movement which will permit an element to be moved laterally, such as a set of portable x-ray equipment which is attached to said device.

Due to its special configuration, the device for sideways movement permits alternation of the direction of movement of the element to which it is affixed.

BACKGROUND TO THE INVENTION

Mobile units are known in the state of the art and are used for various applications such as in electro-medicine, various therapies, and nursing, consisting of a mobile platform with an arrangement of articulated front wheels and a set of back wheels which follow the direction set by the front wheels.

These mobile platforms support heavy equipment which needs to be moved from one place to another through small spaces, which hinders their movement particularly when it is necessary to move the mobile unit in a direction transversal to the direction of the back wheels.

This invention resolves the previous disadvantages by providing a device for sideways movement which is coupled to the mobile unit and which permits its movement in a direction transversal to that defined by the back wheels of the mobile unit.

It is known in the state of the art different devices for sideways movement, in U.S. Pat. No. 6,432,003 B1 patent is disclosed a portable basketball goal system having an adjustable wheel assembly is disclosed. The portable basketball goal system may comprise a rigid pole, a support base, an adjustable wheel assembly, and an engaging member. The support base is configured to maintain the rigid pole in a generally elevated position. The adjustable wheel assembly is connected to the support base and has an engaged and disengaged position. In the engaged position, the wheel assembly supportably engages a playing surface. In the disengage position the wheel assembly may not supportably engage the playing surface. The adjustable wheel assembly may be slidably coupled to the support base. The adjustable wheel assembly may be operated by an engaging member coupled to a cam surface. The cam surface may interact with a follower to transition the adjustable wheel assembly between the supportable and unsupportable engagements.

Additionally in FR 1 526 694 is disclosed a mobile platform for transporting loads.

And finally in EP 628463 A1 is disclosed a truck is described having wheels that are fixed to the front part of a bed with arms interposed there between so freely as to move up and down and designed to roll backwards and forwards in the longitudinal direction when in contact with the ground, wheels that are fixed to the arms with bearing arms interposed there between so freely as to move up and down and designed to roll right and left in the lateral direction when in contact with the ground, and a rear wheel that is fixed to the bed with a hydraulic pressure cylinder interposed there between and capable of changing its direction by the turning of a pumping handle which works the cylinder.

DESCRIPTION OF THE INVENTION

This invention refers to a device for sideways movement which permits alternation of the direction of movement of the element to which it is affixed.

The device for sideways movement is provided with an activation pedal which is articulated with respect to the frame of said lateral movement.

Pulley wheels are arranged which are solid to the activation pedal which move along guides when the pedal is activated. The distance between the pedal articulation and the pulley wheels displaces said wheels and guides in a vertical direction with respect to the frame of the device for sideways movement.

In addition, wheels are arranged solid to the guides which are affected by the same movement in a vertical direction due to the pedal's activation.

The frame for the device for sideways movement is affixed to the mobile element or unit which it is wished to move.

In resting position, that is, without activating the pedal, the wheels are lifted with respect to the surface on which the mobile unit rests as this mobile unit is supported by its own supports.

When the pedal is activated, the pulleys move along the guides, thus in order to maintain their distance with respect to the pedal articulation, said guides move downwards and as a result the wheels which are affixed to them.

Once the wheels make contact with the surface on which the mobile unit rests, and due to the fact that activation continues in the pedal, the mobile unit moves upwards due to the force of the reaction exercised on the wheels by that the surface on which the mobile unit rests.

In this way the mobile unit is now able to move laterally, driven by the wheels of device for sideways movement.

DESCRIPTION OF THE DRAWINGS

The present descriptive report is complemented by a set of plans illustrating a preferred embodiment of the invention, but which is in no way restrictive.

PREFERRED EMBODIMENT OF THE INVENTION

Figure 1:
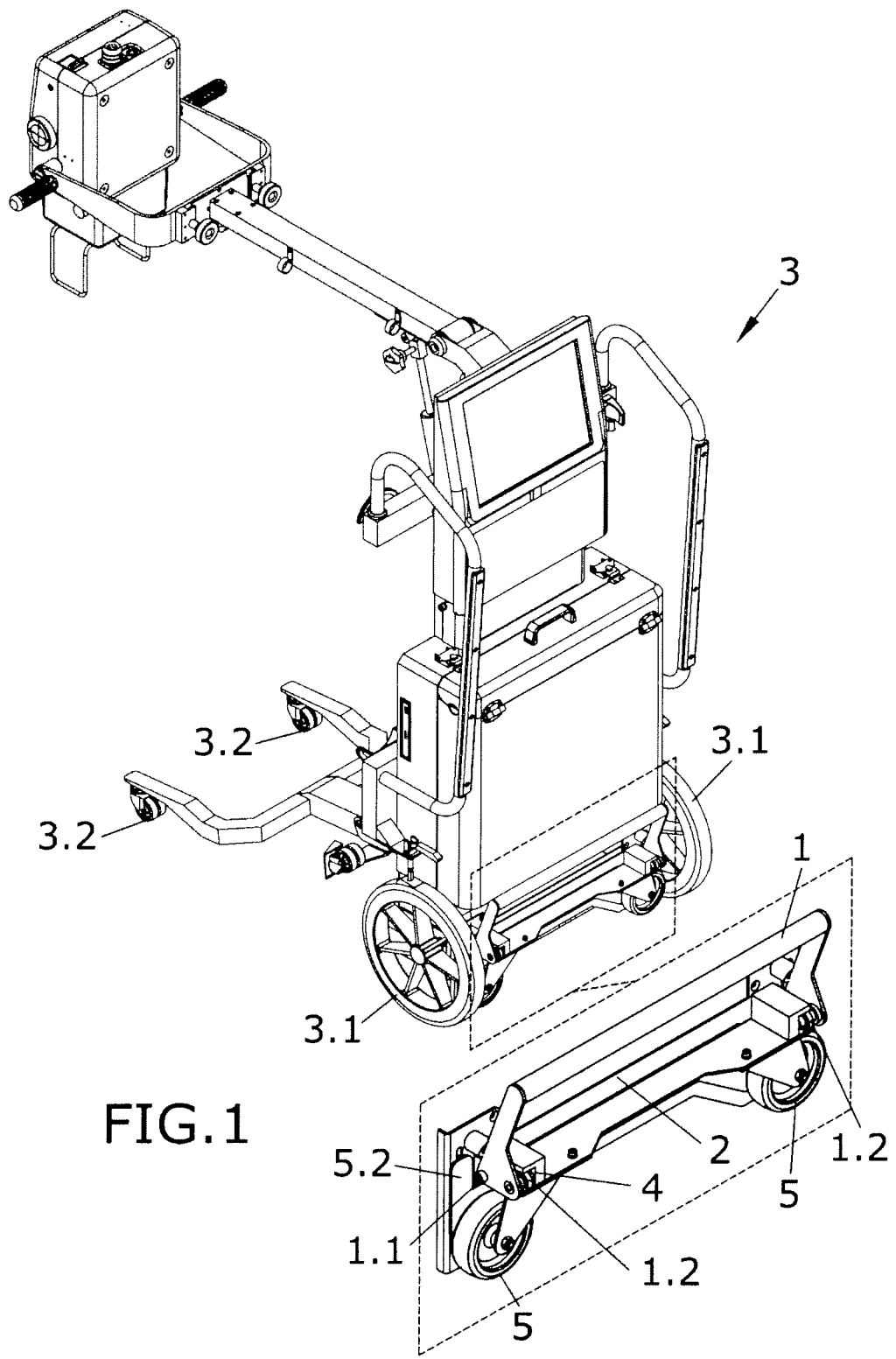
FIG. 1 shows a perspective view of the device for sideways movement joined to a mobile unit.
Figure 2:
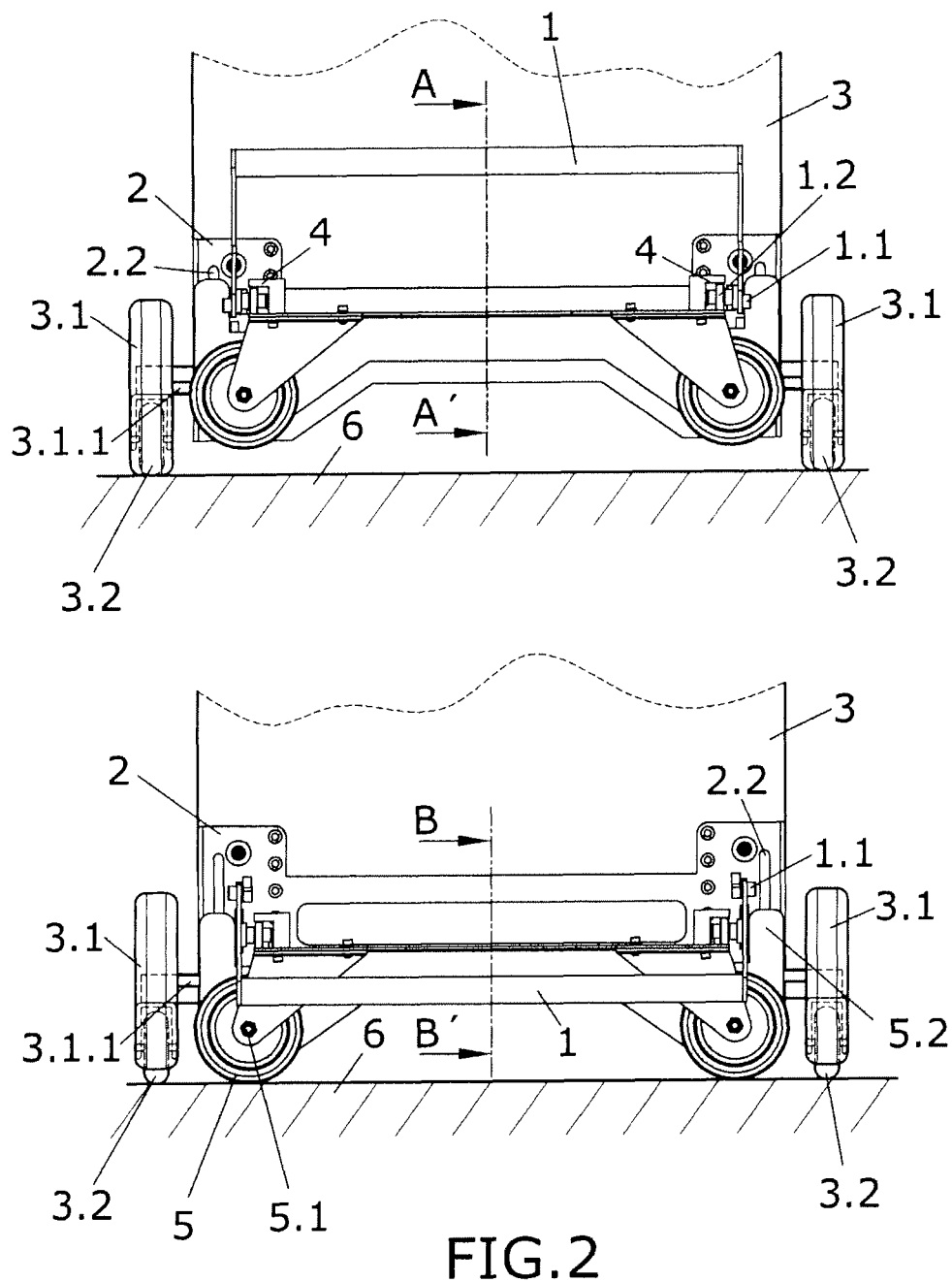
FIG. 2 shows an upright view of the two end positions adopted by the device in order to move laterally, with the upper part in resting position and with the pedal activated in the lower part.
Figure 3:
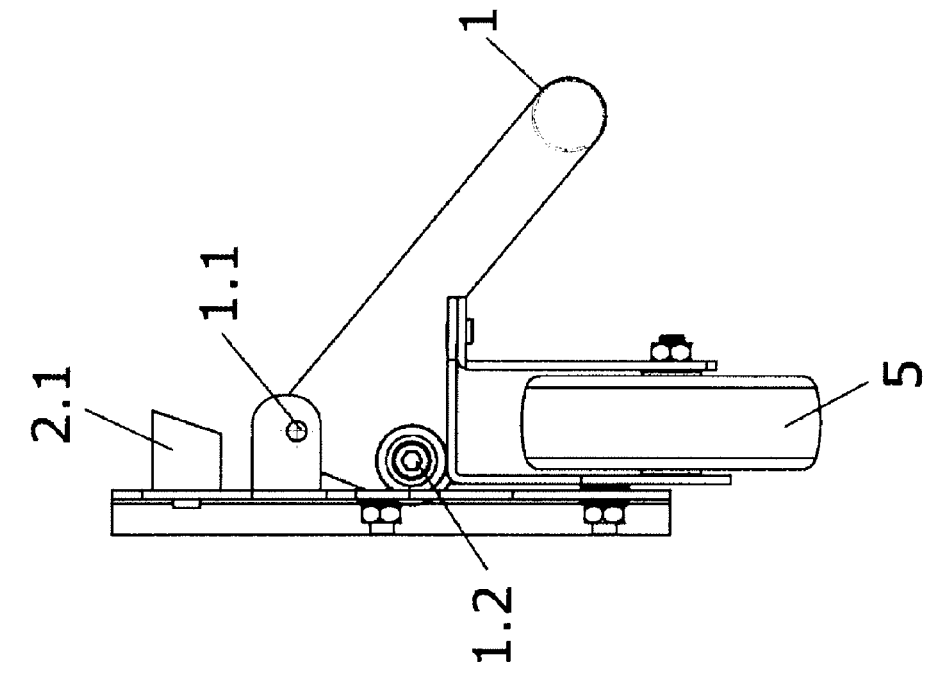
FIG. 3 shows the views of sections AA to the left and BB to the right of FIG. 2.
Figure 3:
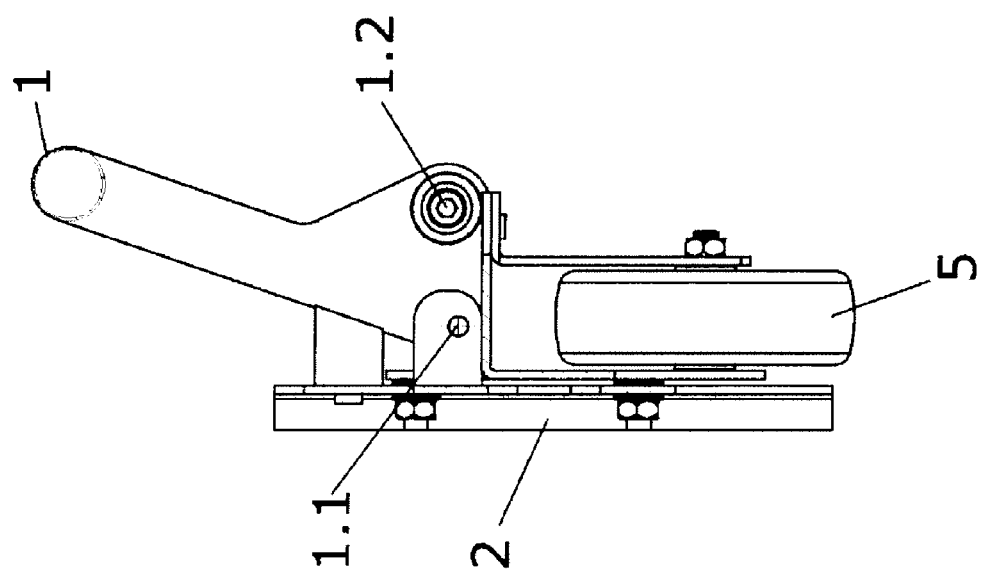

This invention refers to a device for sideways movement which permits alternation of the direction of movement of the element to which it is affixed.

The device for sideways movement is provided with an activation pedal (1) which is articulated through respective articulations (1.1) symmetrical to a frame (2) of said device for sideways movement, which in turn is affixed to a mobile unit (3) carrying the portable X-ray equipment.

The activation pedal (1) is provided with pulleys (1.2) which move along guides (4) when the pedal is activated. When this occurs, the radius of rotation defined between the articulations (1.1) and the pulleys (1.2) moves the pulleys in a vertical direction with respect to the frame (2), in turn dragging the guides (4) in that direction.

In addition, wheels (5) are arranged solid to the guides (4) which are affected by the same movement in a vertical direction as the pulleys (1.2) and guides (1.1) due to the pedal's (1) activation.

In the resting position, that is, without activating the pedal (1), the wheels (5) are elevated with respect to the surface (6) on which the mobile unit rests (3) together with the portable X ray equipment, as this mobile unit is supported by its own supports (3.1, 3.2) which in this example of a preferred embodiment are two back wheels (3.1) and two front guide wheels (3.2).

In this resting position, the pedal (1) is in contact with a stop (2.1) situated on the frame (2) which defines said resting position.

When the wheels (5) of the device for sideways movement make contact with the surface (6) on which the mobile unit rests (3) together with the portable X ray device, and due to the fact that activation of the pedal (1) continues, the mobile unit (3) and the portable equipment is moved upwards due to the force of reaction exercised by the surface (6) on the wheels (5) of the device for sideways movement, with the mobile unit (3) resting on its front guide wheels (3.2) and on the wheels (5) of the device for sideways movement.

The wheels (5) of the device for sideways movement are provided with a support 5.2) which is guided by grooves (2.2) situated in the frame (2) which facilitates vertical movement thereof (2).

The rotation axis (5.1) of the wheels (5) of the device for sideways movement is perpendicular to the rotation axis (3.1.1) of the back wheels (3.1) of the mobile unit (3) which permits lateral movement thereof (3) and the portable X ray equipment, that is, in a direction perpendicular to the direction of advance of the back wheels (3.1) of the mobile unit (3).

The essential nature of this invention is not altered by any variations in materials, form, size and arrangement of its component elements, which are described in a non-restrictive manner, with this being sufficient to proceed to its reproduction by an expert.

What is claimed is:

1. A device for sideways movement of a mobile unit (3) along a surface comprising:
    a frame (2) joined to the mobile unit (3) and including at least one guide (4);
    an activation pedal (1) articulated to said frame (2) about at least one articulation (1.1) for articulation of the activation pedal (1) between a resting position and an articulated position;
    at least one pulley (1.2) solidly attached to said activation pedal (2) and disposed along said at least one guide (4) of said frame (2);
    at least one wheel solidly (5) attached to said frame (2) and disposed in raised relationship with the surface in said resting position of said activation pedal (1); and
    said at least one pulley (1.2) and said at least one articulation (1.1) defining a radius of rotation extending therebetween having a constant distance during the articulation of said activation pedal (1) for moving said at least one pulley (1.2) along said at least one guide (4) to drag said at least one guide (4) and said at least one wheel (5) in a vertical direction with respect to said frame (2).

2. A device for sideways movement according to claim 1 wherein the mobile unit (3) is supported by its own supports (3.1, 3.2) in said resting position of said activation pedal (1).

3. A device for sideways movement according to claim 1 wherein said at least one wheel moves towards the surface during the articulation of said activation pedal (1) from said resting position to said activation position (5) to make contact with the surface (6) on which the mobile unit (3) rests in said articulated position of the activation pedal (1) and move the mobile unit (3) upwards due to a force of reaction exercised on said at least one wheel (5) by the surface (6) on which the mobile unit (3) rests.

4. A device for sideways movement according to claim 2 wherein the supports (3.1, 3.2) of the mobile unit (3) include two back wheels (3.1) and two front guide wheels (3.2).

5. A device for sideways movement according to claim 4 wherein the mobile unit (3) rests on the front guide wheels (3.2) and on said at least one wheel (5) of the device in said articulated position of said activation pedal (1).

6. A device for sideways movement according to claim 5 wherein a rotation axis (5.1) of said at least one wheel (5) is perpendicular to a rotation axis (3.1.1) of the back wheels (3.1) of the mobile unit (3) for permiting lateral movement of the mobile unit (3) in a direction perpendicular to a direction of advance of the back wheels (3.1) of the mobile unit (3).

7. A device for sideways movement according to claim 1 wherein the mobile unit (3) carries a set of portable X ray equipment.

8. A device for sideways movement according to claim 1 wherein said frame (2) defines at least one groove (2.2) and said at least one wheel (5) is provided with a support (5.2) which is guided by said at least one groove (2.2) present in said frame (2).

9. A device for sideways movement according to claim 2 wherein said activation pedal (1) enters into contact with a stop (2.1) situated on said frame (2) in said resting position of said activation pedal (1).

* * * * *